(12) United States Patent
Giraud

(10) Patent No.: US 9,700,843 B2
(45) Date of Patent: Jul. 11, 2017

(54) VOLUMETRIC PRESSURE EXCHANGER FOR A SEAWATER DESALINATION PLANT AND DESALINATION PLANT

(71) Applicant: Arkling Limited, Gibralter (GI)

(72) Inventor: Yves Giraud, Panissieres (FR)

(73) Assignee: ARKLING LIMITED, Gibraltar (GI)

( * ) Notice: Subject to any disclaimer, the term of this patent is extended or adjusted under 35 U.S.C. 154(b) by 175 days.

(21) Appl. No.: 14/354,395

(22) PCT Filed: Oct. 19, 2012

(86) PCT No.: PCT/IB2012/055750
§ 371 (c)(1),
(2) Date: Apr. 25, 2014

(87) PCT Pub. No.: WO2013/061229
PCT Pub. Date: May 2, 2013

(65) Prior Publication Data
US 2014/0284262 A1    Sep. 25, 2014

(30) Foreign Application Priority Data

Oct. 25, 2011 (FR) ...................... 11 59647

(51) Int. Cl.
| | |
|---|---|
| *B01D 61/06* | (2006.01) |
| *C02F 1/44* | (2006.01) |
| *B01D 61/08* | (2006.01) |
| *F04B 9/117* | (2006.01) |
| *F04F 13/00* | (2009.01) |
| *C02F 103/08* | (2006.01) |

(52) U.S. Cl.
CPC ............. *B01D 61/08* (2013.01); *B01D 61/06* (2013.01); *C02F 1/441* (2013.01); *F04B 9/1176* (2013.01); *F04F 13/00* (2013.01); *B01D 2313/246* (2013.01); *C02F 2103/08* (2013.01); *C02F 2303/10* (2013.01); *Y02W 10/30* (2015.05)

(58) Field of Classification Search
None
See application file for complete search history.

(56) References Cited

U.S. PATENT DOCUMENTS

| | | |
|---|---|---|
| 4,124,488 A | 11/1978 | Wilson |
| 6,652,741 B1 | 11/2003 | Marinzet |

FOREIGN PATENT DOCUMENTS

| | | |
|---|---|---|
| EP | 1 108 461 A | 6/2001 |
| FR | 2953566 A | 6/2011 |
| KR | 10-2011-0100471 A | 9/2011 |

(Continued)

*Primary Examiner* — Krishnan S Menon
(74) *Attorney, Agent, or Firm* — Haug Partners LLP

(57) ABSTRACT

Volumetric pressure exchanger comprising at least one unit for pressure exchange with a hollow cylindrical body, a piston sliding in said body, said piston comprising a piston crown separating the inside of said cylindrical body into a downstream chamber and an upstream chamber, said piston comprising a rod arranged on the downstream chamber side and passing through said downstream chamber, said downstream chamber being equipped with a device for admitting and delivering water for treatment, said upstream chamber being equipped with a three-way rotary-slide valve, said rotary slide being rotated by motorized drive means, said valve comprising a pressurized-liquid supply orifice, a discharge orifice for said liquid, and an opening communicating with said upstream chamber.

13 Claims, 3 Drawing Sheets

(56) References Cited

FOREIGN PATENT DOCUMENTS

| WO | WO 2011/058249 A | 5/2011 |
| WO | WO 2011/070244 A | 6/2011 |
| WO | WO 2011/108783 A | 9/2011 |

VOLUMETRIC PRESSURE EXCHANGER FOR A SEAWATER DESALINATION PLANT AND DESALINATION PLANT

This application is a 371 of PCT/IB2012/055750 filed on Oct. 19, 2012, which claims priority benefits from French Patent Application No. 11 59647 filed Oct. 25, 2011, the disclosure of which is incorporated herein by reference.

TECHNICAL FIELD

The present invention relates to a volumetric pressure exchanger for a seawater desalination plant using reverse osmosis and to a desalination plant.

In the present application, unless otherwise explicitly or implicitly indicated, the terms "cylinder" and "cylindrical" refer to a body delimited by—or a shape or surface created by—parallel straight lines pressing on a closed contour that may be circular.

STATE OF THE ART

In seawater desalination plants using reverse osmosis, a reverse osmosis module (ROM) made up of semi-permeable membranes, is fed with seawater brought to a high pressure, generally comprised between 50 and 80 bars, higher than the osmotic pressure of the salt water, which is approximately 25 bars. At the outputs of the ROM, a permeate of desalinated water (which is at a pressure close to atmospheric pressure) is recovered on the one hand, and a so-called "over-salted" water concentrate is recovered on the other hand. This concentrate is at a pressure slightly below the supply pressure, i.e., generally below the latter by approximately 1 to 5 bars, since the pressure drop caused by the passage in the ROM is low.

To decrease the energy cost of a seawater desalination process using reverse osmosis, it is important to recover the mechanical energy from the high-pressure concentrate as much as possible.

A certain number of patents, such as patents U.S. Pat. Nos. 4,124,488 and 6,652,741, describe reverse osmosis desalination plants including piston pumps designed to deliver pressurized seawater to the input of a ROM, the rear face of the piston receiving the extra pressure from the concentrate during the compression of the seawater to be desalinated. These plants are controlled in different ways, for example by a hydraulic power plant, or by various types of distributors, such as slide valves.

Patent application WO2011/070244 by the applicant also describes such a desalination plant, comprising a ROM supplied with pressurized seawater by a pump driven by an electric motor. This motor also drives a mechanism of that device, which comprises a three-way valve with a rotary stopper, which controls the intake of concentrate into the pump. The piston of the pump separates each cylinder of the pump into a downstream chamber and an upstream chamber. The rod of the piston crosses through the upstream chamber and its end is articulated to the drive mechanism of the motor. The downstream chamber is supplied with seawater by a pipe equipped with an intake check valve and delivers pressurized seawater to the supply pipe of the ROM, which in turn is equipped with a discharge check valve. The upstream chamber of the pump is connected to the concentrate output pipe of the ROM by the three-way valve, the third passage thereof emerging into a concentrate emptying pipe. The movements of the piston of the pump and the stopper of the valve are synchronized so as alternately to allow the high-pressure concentrate to enter the upstream chamber when the piston pushes the seawater toward the ROM and to discharge that concentrate toward the outlet during the reverse movement of the piston.

Patent application WO2011/058249 by the applicant describes such a valve with a rotary stopper for a desalination plant, allowing a high flow rate of water without a significant pressure loss and withstanding the high pressure of the concentrate leaving the ROM.

It is, however, desirable to improve the devices allowing the recovery of energy from the concentrates coming from the ROMs, in order to decrease the production cost of desalinated water.

It is in particular desirable to equip desalination units which are not supplied with such devices, without having to eliminate and replace the pre-existing high-pressure pumping devices.

It is lastly desirable to propose devices of this type with long lifetimes and only requiring minimal maintenance stops.

BRIEF DESCRIPTION OF THE INVENTION

To that end, the invention relates to a volumetric pressure exchanger of the type initially defined, comprising at least one pressure exchange unit, said pressure exchange unit comprising a hollow cylindrical body, a piston sliding in said body, said piston comprising a piston head separating the inside of said cylindrical body into a downstream chamber and an upstream chamber, said piston comprising a rod arranged on the side of the downstream chamber and crossing through said downstream chamber, said downstream chamber being provided with an intake and discharge device for water to be treated, said upstream chamber being provided with a three-way valve with a rotary gate, said rotary gate being rotated by motorized driving means, said gate comprising an orifice for supplying a pressurized concentrate, an orifice for discharging said concentrate, and an opening for communicating with said upstream chamber.

According to one embodiment, said intake and discharge device for water to be treated comprises a cylinder head arranged in the extension of the downstream chamber of said cylindrical body, an intake orifice with an intake check valve, a discharge orifice with a check valve, said piston rod crossing through said cylinder head with its end emerging outside the volumetric pressure exchanger.

According to one embodiment, said three-way valve comprises a valve body arranged in the extension of the upstream chamber of said cylindrical body.

According to one embodiment, the axis of rotation of the rotary gate is parallel to the axis of the cylindrical body.

According to one embodiment, the rotary gate has a side opening configured so as to allow a placement in fluid communication and an end of fluid communication with the supply and evacuation orifices of the valve.

According to one embodiment, the dynamic sealing of said valve is done using annular cylinder pistons bearing on the rotary gate, in particular annular cylinder pistons made from composite materials with a low friction coefficient.

According to one embodiment, said annular cylinder pistons are pressurized by fluid connections with the concentrate, either directly or through a pressure multiplier.

According to another embodiment, said annular cylinder pistons are placed under pressure by a secondary hydraulic generating set.

The volumetric pressure exchanger according to the invention may comprise a plurality of pressure exchange units as defined above.

According to one embodiment, the motorized driving means comprise a shared motor and means for calibrating the rotary gates so as to be evenly distributed over 360°.

The invention also relates to a seawater desalination plant using reverse osmosis comprising a volumetric pressure exchanger as defined above.

In particular, the number of pressure exchange units, the bore and the travel of the cylindrical bodies are adjusted as a function of the available concentrate flow rate of the plant.

According to one embodiment, the speed of rotation of the rotary gates is adjusted such that during each cycle, said piston(s) do not reach the upper end of travel.

BRIEF DESCRIPTION OF THE FIGURES

Other aspects, features and advantages of the invention will appear to one skilled in the art from the following description, which illustrates, but is not limited to, one preferred embodiment of the invention, in reference to the appended figures, in which.

DETAILED DESCRIPTION OF THE INVENTION

Figure 1:
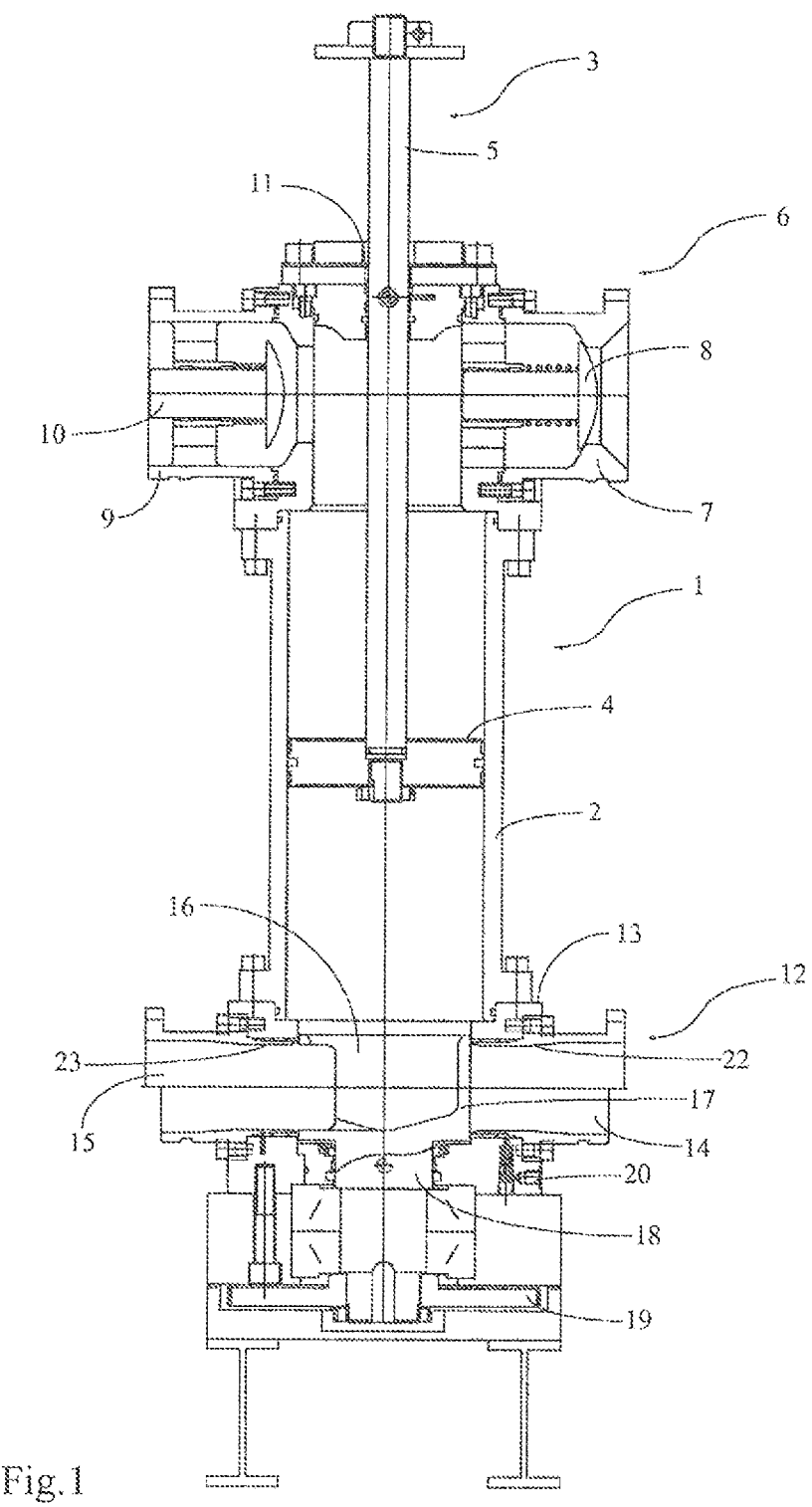
FIG. 1 is a longitudinal cross-sectional view of a pressure exchange unit according to the invention.

FIG. 1 shows a pressure exchange unit 1, the central part of which is made up of a cylindrical body 2 in which a piston 3 slides, said piston being formed by a piston head 4 and a piston rod 5. The piston head 4 separates the inside of the cylindrical body 2 into a downstream chamber and an upstream chamber. The piston rod is fastened to the piston head 4 on the side of the downstream chamber. The cylindrical body 2 is topped at its first end, on the side of the downstream chamber, by a cylinder head 6, which is sealably secured with the cylindrical body 2 using flange-type means, seals and bolts, which are known in themselves.

The cylinder 6 bears an intake orifice 7 capable of connecting an intake duct thereto for seawater to be treated. The intake orifice 7 houses an intake check valve 8. The structure of such valves is known in itself by those skilled in the art. The cylinder head 6 also bears a discharge orifice 9 capable of connecting a pipe thereto bringing in seawater to the ROM. The discharge orifice 9 also houses a check valve 10. The cylinder head 6 also comprises, in the axial position, a guide orifice 11 allowing the passage of the piston rod 5, the free end of which emerges from the pressure exchange unit 1. The guide orifice 11 is provided with sealing gaskets, known in themselves, allowing the piston rod to slide without significant pressure losses of the water to be treated.

At the second end of the cylindrical body 2, on the side of the upstream chamber, a valve 12 is arranged, which extends that chamber upstream and whereof the valve body 13 is sealably secured to the cylindrical body 2 using means of the flange seal and bolt type, known in themselves. The valve 12, which is an integral part of the pressure exchange unit 1, comprises a supply orifice 14 for supplying pressurized concentrate, an evacuation orifice 15 for said concentrate, and a communication link 16 with said upstream chamber.

Figure 2:
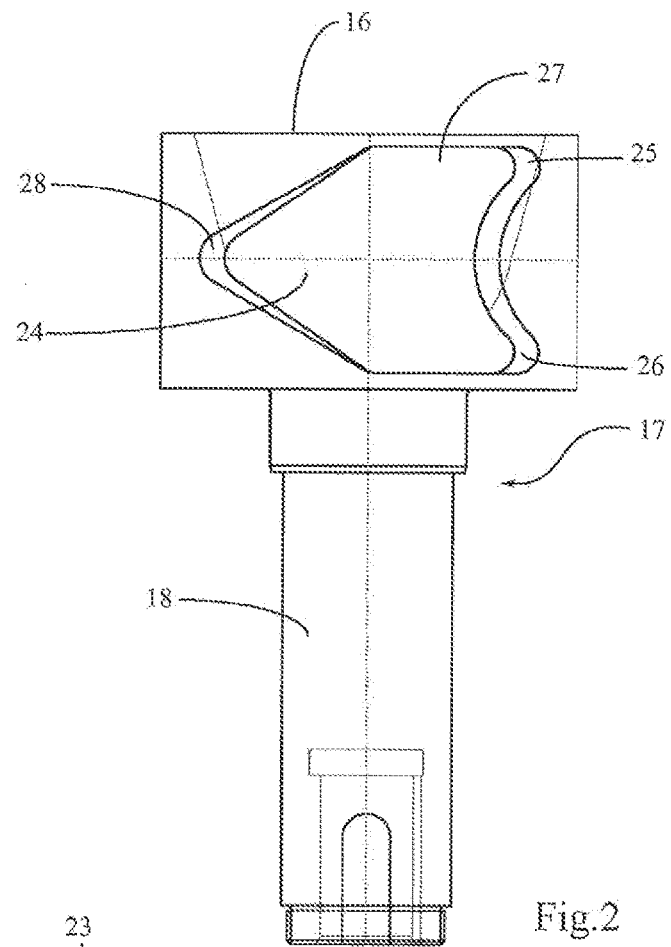
FIG. 2 is a lateral elevation view of a rotary valve gate.
Figure 3:
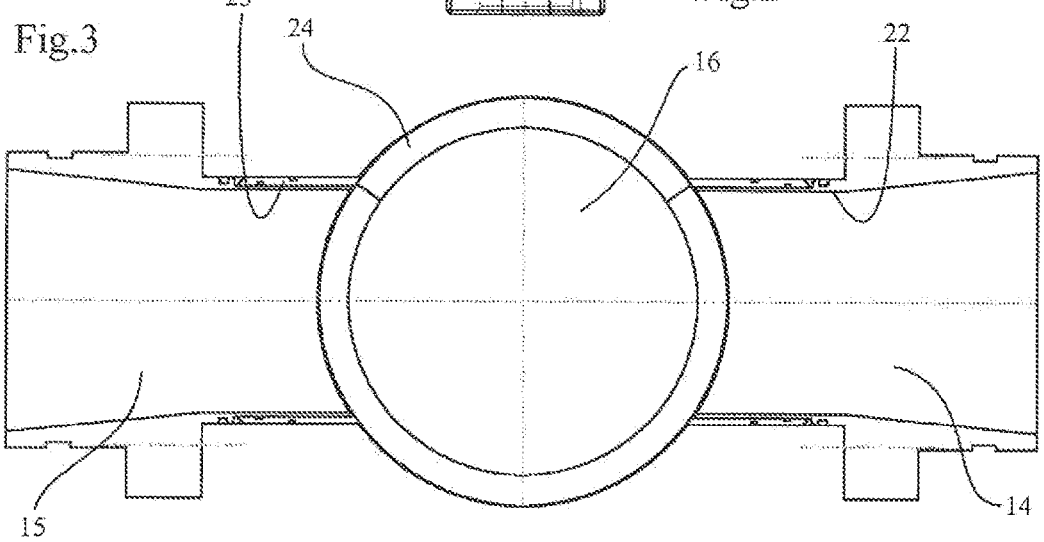
FIG. 3 is a simplified horizontal axial cross-section showing the rotary gate of FIG. 2, housed in its valve.

As shown in FIGS. 2 and 3, the rotary gate 17 comprises a hollow cylindrical upper part, which has, at its upper end, a wide communication opening 16, communicating with the upstream chamber of the cylindrical body 2, and which has, on its side flanks a side opening 24 alternately making it possible, depending on the position of the gate, to put the inside of the gate, and consequently the communication opening 16, in communication with the supply orifice 14 or the evacuation orifice 15.

In the embodiment illustrated in FIG. 2, the opening 24 has a first end 28 in the shape of a "V", a rectangular middle part 27, and a second end in the shape of a "W" with two extensions 25, 26. This particular shape of the opening 24 allows a progressive placement in communication and end of communication with the supply 14 and evacuation 15 orifices, so as to eliminate abrupt pressure and flow rate variations of the upstream chamber of the pressure exchange unit. The lower part of the rotary gate 17 comprises a driving shaft 18 that is intended to be connected to a mechanical drive device.

In the embodiment shown in FIG. 1, the axis of rotation of the rotary gate 17 coincides with the sliding axis of the rod 5, that arrangement being simplest in terms of the construction of the valve body 13 and the fastening thereof to the cylindrical body 2. The drive shaft 18 of the gate 17 emerging from the valve body 13 is driven by a driving device 19, which in turn is connected to a drive motor, which can be connected using gears meshing with pinions, transmission belts or any other means known in the state of the art. The drive motor, in particular with an electric gear motor, may have a fixed speed or a speed regulated by a variable speed transmission.

The rotary gate 17 is in permanent rotation. The dynamic sealing of the valve 12 is done without a seal, using annular cylinder pistons 22, 23, bearing on the rotary gate. Preferably, the annular cylinder pistons are made from composite materials with a low friction coefficient. Said annular cylinder pistons may be pressurized at 20 by their fluid connection with the concentrate, either directly or through a pressure multiplier. Alternatively, they may be pressurized by a secondary hydraulic generator set. These annular cylinder pistons bear on the rotary gate, preventing the direct passage of the concentrate from the supply orifice 14 to the evacuation orifice 15. These pistons advance in the housing over the course of their wear, which minimizes the number of stops for maintenance. Likewise, the rotary gate is preferably made from stainless steel and receives a suitable surface treatment to increase its wear resistance and decrease the friction coefficient.

The pressure exchange unit structure described above works as follows:

The seawater, provided by a booster pump of the desalination plant, penetrates the cylinder head 6, and therefore the inside of the downstream chamber of the cylindrical body 2, through the intake orifice 7 and leaves it through the discharge orifice 9, the intake 8 and discharge 10 valves preventing a reverse flow. The rotary gate 17 of the three-way valve 12 is in permanent rotation.

At the beginning of the cycle, when the piston 3 is in the low position and when the concentrate supply orifice 14 comes into communication with the communication opening 16, the concentrate penetrates the inside of the upstream chamber of the cylindrical body, the downstream chamber being filled with seawater. The piston rises, pushed by the high-pressure concentrate, and discharges the seawater through the discharge valve 10. One skilled in the art will note that the seawater is discharged at a pressure above that of the concentrate because the area of the piston head 4 on the side of the upstream chamber is larger than the area on the side of the downstream chamber, due to the presence of the piston rod 5 on the side of the downstream chamber. The pressure of the concentrate being equal to the pressure of the seawater to be treated at the input of the ROM, decreased by pressure drops between the membrane and the exchanger, this pressure difference between the upstream chamber and downstream chamber makes it possible to compensate said pressure losses without using high-pressure pumps. This pressure difference may be adjusted by modifying the diameter of the piston rod 5. By continuing its rotation, the rotary gate 17 gradually closes the passage for the concentrate from the supply orifice 14 to the upstream chamber, such that the piston 3 reaches its high position.

By continuing its rotation, the rotary gate 17 progressively opens the communication between the upstream chamber of the cylindrical body 2 and the evacuation orifice 15, such that the pressure of the concentrate in the upstream chamber of the cylinder 2 decreases. As a result, the discharge valve 10 closes. The seawater provided by a booster pump of the desalination plant penetrates through the intake valve 8 and pushes the piston 3 downward while discharging the concentrate. A new cycle then begins.

Figure 4:
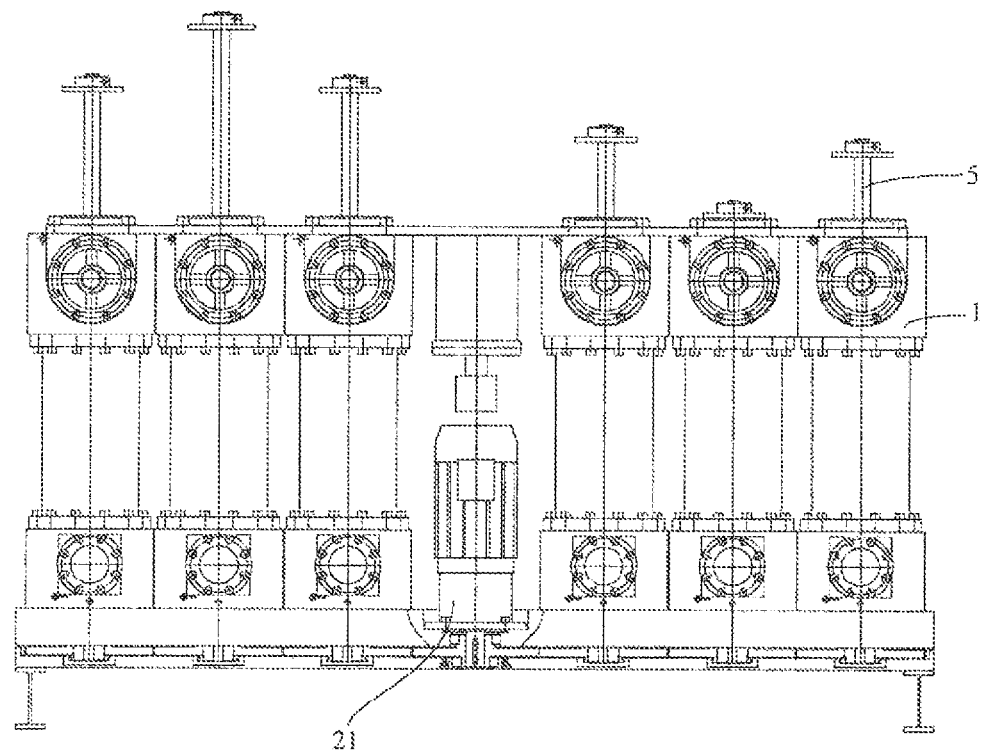
FIG. 4 is a diagrammatic elevation view of a volumetric pressure exchanger comprising 6 pressure exchange units.

FIG. 4 shows a volumetric pressure exchanger comprising six pressure exchange units of the type shown in FIG. 1, mounted in parallel. An electric gear motor 21, shared by the six units, provides the rotation of the six rotary gates. As shown by the respective positions of the free ends of the piston rods, the positions of the gates are calibrated with an offset of 60° relative to one another, so as to ensure operation without impacts or noise of the system.

The number, diameter and travel of the cylinders are calculated based on the available concentrate flow rate of the desalination plant in which the volumetric pressure exchanger is designed to be mounted. The speed of rotation of the gates is preferably adjusted such that the pistons do not reach the upper end of travel; in this way, the volumetric pressure exchanger is made self-adapting to the incoming flow rate, within a wide flow rate range that may approach a zero flow rate, without decreased output. Furthermore, the flow rate of entering seawater always being more than needed, the pistons descend upon each cycle to the low end of travel; however, the particular shape of the side opening of the rotary gate progressively slows the piston so as to avoid impacts at the low end of travel. Additionally, a polyurethane damper may be placed so as to prevent any risk of this type of impact.

In summary, the volumetric pressure exchanger according to the invention offers the following features and advantages:
 very high overall output due to the low energy consumption of the distribution system and the absence of pressure increase pump;
 no concentrate/seawater mixture;
 no hydraulic pulses, the movement speed of the pistons adapting to the available concentrate flow rate;
 adaptability to the available flow rate without subjugation system and without loss of output;
 relatively quiet operation;
 possibility of very high flow rate;
 small bulk, small number of short connecting lines;
 simple and inexpensive maintenance;
 the system does not require filtration of the water below 50 microns.

The invention claimed is:

1. A volumetric pressure exchanger comprising at least one pressure exchange unit, wherein said pressure exchange unit comprises a hollow cylindrical body, a piston sliding in said body, said piston comprising a piston head separating the inside of said cylindrical body into a downstream chamber and an upstream chamber, said piston comprising a rod fixed to said piston head, arranged on the side of the downstream chamber and crossing through said downstream chamber, said downstream chamber being provided with an intake and discharge device for water to be treated, said upstream chamber being provided with a three-way valve with a rotary gate, said rotary gate being rotated by motorized driving means, said gate comprising an orifice for supplying a pressurized concentrate, an orifice for discharging said concentrate, and an opening for communicating with said upstream chamber, wherein the volumetric pressure exchanger is configured to not mix the water to be treated with the pressurized concentrate, and wherein the speed of rotation of the gate is adjusted such that the piston does not reach an upper end of travel, so that the volumetric pressure exchanger is made self-adapted to an incoming flow rate.

2. The exchanger according to claim 1, wherein said intake and discharge device for water to be treated comprises a cylinder head arranged in the extension of the downstream chamber of said cylindrical body, an intake orifice with an intake check valve, a discharge orifice with a check valve, said piston rod crossing through said cylinder head with its end emerging outside the volumetric pressure exchanger.

3. The exchanger according to claim 1, wherein said three-way valve comprises a valve body arranged in the extension of the upstream chamber of said cylindrical body.

4. The exchanger according to claim 3, wherein the axis of rotation of the rotary gate is parallel to the axis of the cylindrical body.

5. The exchanger according to claim 4, wherein the rotary gate has a side opening configured so as to allow a placement in fluid communication and an end of fluid communication with the supply and evacuation orifices of the valve.

6. The exchanger according to claim 1, wherein the dynamic sealing of said valve is done using annular cylinder pistons bearing on the rotary gate, in particular annular cylinder pistons made from composite materials with a low friction coefficient.

7. The exchanger according to claim 6, wherein said annular cylinder pistons are pressurized by fluid connections with the concentrate, either directly or through a pressure multiplier.

8. The exchanger according to claim 6, wherein said annular cylinder pistons are placed under pressure by a secondary hydraulic generating set.

9. A volumetric pressure exchanger, wherein it comprises a plurality of pressure exchange units according to claim 1.

10. The exchanger according to claim 9, wherein said motorized driving means comprise a shared motor and means for calibrating the rotary gates so as to be evenly distributed over 360°.

11. A seawater desalination plant using reverse osmosis comprising a volumetric pressure exchanger according to claim 1.

12. The desalination plant according to claim 11, wherein the number of pressure exchange units, the bore and the travel of the cylindrical bodies are adjusted as a function of the available concentrate flow rate of the plant.

13. The plant according to claim 11, wherein the speed of rotation of the rotary gates is adjusted such that during each cycle, said piston(s) do not reach the upper end of travel.

* * * * *